United States Patent
Ben Rached et al.

(10) Patent No.: US 6,754,264 B1
(45) Date of Patent: Jun. 22, 2004

(54) DIGITAL EQUALIZATION METHOD, AND A RADIO COMMUNICATION RECEIVER IMPLEMENTING SUCH METHOD

(75) Inventors: Nidham Ben Rached, Paris (FR); Sarah Boumendil, Paris (FR)

(73) Assignee: Nortel Matra Cellular (FR)

( * ) Notice: Subject to any disclaimer, the term of this patent is extended or adjusted under 35 U.S.C. 154(b) by 0 days.

(21) Appl. No.: 09/646,231

(22) PCT Filed: Mar. 22, 1999

(86) PCT No.: PCT/FR99/00661
§ 371 (c)(1),
(2), (4) Date: Sep. 12, 2000

(87) PCT Pub. No.: WO99/49632
PCT Pub. Date: Sep. 30, 1999

(30) Foreign Application Priority Data

Mar. 25, 1998 (FR) .............................. 98 03680

(51) Int. Cl.$^7$ ................................................ H03H 7/30
(52) U.S. Cl. ...................................... 375/232; 375/229
(58) Field of Search ................................ 375/229, 230, 375/231, 232, 233, 234, 235, 236; 333/18; 708/322, 323, 819

(56) References Cited

U.S. PATENT DOCUMENTS 4,644,562 A * 2/1987 Kavehrad et al. ........... 375/232
5,436,929 A * 7/1995 Kawas Kaleh .............. 375/233
5,790,598 A * 8/1998 Moreland et al. ........... 375/233

OTHER PUBLICATIONS

Demeure et al., Linear Statistical Models for Stationary Sequences and Related Algorithms for Cholesky Factorization of Toeplitz Matrices, Jan. 1987, IEEE, pp. 29–43.*

Yagle, Generalized Levinson and Fast Cholesky Algorithms for Three–Dimensional Random Field Estimation Problems, 1988, IEEE, pp. 1060–1063.*

* cited by examiner

Primary Examiner—Stephen Chin
Assistant Examiner—Sam K. Ahn
(74) Attorney, Agent, or Firm—Piper Rudnick LLP

(57) ABSTRACT

Discrete symbols of transmitted signals, forming part of the components of a vector D of size N, are estimated from a vector Y of L digital samples of a received signal. The vector Y may be broken down into $Y=AD+Y_N$, where A is a matrix of size L×N previously determined from measurements of at least one transmission channel reply and $Y_N$ represents a vector of L noise samples. The method includes determining an upper triangular matrix T of size N×N and a vector Z of size N such that the quadratic criteria $\|TX-Z\|^2$ and $\|AX-Y\|^2$ are minimal for the same vector X of size N, and dividing the vector Z and the matrix T into blocks so as to operate a minimisation of the quadratic criterion block by block along the diagonal of matrix T.

29 Claims, 3 Drawing Sheets

DIGITAL EQUALIZATION METHOD, AND A RADIO COMMUNICATION RECEIVER IMPLEMENTING SUCH METHOD

RELATED APPLICATION

This is a 371 of PCT/FR99/00661 filed on Mar. 22,1999.

BACKGROUND OF THE INVENTION

The present invention relates to digital equalisation of signals. It finds a major application in the field of radio communications.

The method is applicable when the received signal results from a superimposition of different signals, sent from the same transmitter and/or different transmitters, for which the responses of the transmission channels between transmitter and receiver have been determined beforehand. One of the major problems arising in this situation is to strike a compromise between performance of the equaliser and its complexity. A complete maximum likelihood estimation of all the symbols of the overlaid signals is theoretically possible, using the Viterbi algorithm for example (see G. D. Forney Jr.: "The Viterbi Algorithm", Proc. of the IEEE, Vol. 61, No. 3, March 1973, pages 268–278). However, as the impulse response of the channels becomes long or the number of overlaid signals is high, the exponential complexity of these methods makes them impractical.

Spread spectrum radio communications using code division multiple access (CDMA) illustrate this problem.

Let us assume that K synchronous logical channels, denoted here by an index k ($1 \leq k \leq K$), share the same physical channel, i.e. use the same carrier frequency at the same time, and are differentiated by spreading sequences $c^k$ respectively assigned to them. Each channel is used to transmit a respective signal made up of successive sequences $d^k$, or frames, of n symbols $d_p^k$ ($1 \leq p \leq n$). The symbols $d_p^k$ have discrete values: binary ($\pm 1$) in the case of a BPSK modulation, quaternary ($\pm 1 \pm j$) in the case of a QPSK modulation, . . .

Let us also assume that the spreading sequences $c^k$ have a rate Q times greater than that of the symbols $d_p^k$, Q being an integer representing a spreading factor (the extreme situation Q=1 corresponds to no spreading), and a periodicity equal to the period of a symbol. The complex-valued samples (generally $\pm 1$ or $\pm 1 \pm j$) of the spreading sequences $c^k$ or "chips" are written $c_q^k$ ($1 \leq q \leq Q$). The sequences $c^k$ are selected so as to be mutually orthogonal $$\left( \sum_{q=1}^{Q} c_q^k \cdot c_q^{k'} = 0 \text{ where } k \neq k' \right)$$

in order to make it easier to distinguish between the channels. However, the propagation conditions, particularly the multiple paths, do not generally preserve this orthogonality, particularly in the case of short spreading sequences.

After base band conversion, digitisation and adapted filtering, a vector Y of the received signal reflecting the symbols emitted over a frame period is expressed as follows:

$$Y = \begin{pmatrix} y_1 \\ y_2 \\ \vdots \\ y_p \\ \vdots \\ y_L \end{pmatrix} = \sum_{k=1}^{K} \begin{pmatrix} r_1^k & 0 & 0 & \cdots & 0 \\ r_2^k & r_1^k & & & \\ & r_2^k & \ddots & & \vdots \\ \vdots & & \ddots & 0 & 0 \\ & & \ddots & 0 & 0 \\ r_W^k & & r_1^k & 0 \\ 0 & r_W^k & & r_2^k & r_1^k \\ 0 & 0 & & & r_2^k \\ & & & & \vdots \\ \vdots & & \ddots & & r_W^k \\ 0 & 0 & \cdots & 0 & r_W^k \end{pmatrix} \begin{pmatrix} c_1^k \cdot d_1^k \\ c_2^k \cdot d_1^k \\ \vdots \\ c_Q^k \cdot d_1^k \\ c_1^k \cdot d_2^k \\ \vdots \\ c_q^k \cdot d_p^k \\ \vdots \\ c_Q^k \cdot d_n^k \end{pmatrix} + Y_N \quad (1)$$

where W is the length, in number of chips, of the estimated impulse response of the channels, $r^k = (r_1^k, \ldots, r_w^k)$ is the estimated impulse response of the k-th channel, the $r_j^k$ being complex numbers such that $r_j^k = 0$ if $j \leq 0$ or $j > W$, $y_p$ is the p-th complex sample received (at the chip frequency) where $1 \leq p \leq L = nQ+W-1$, and $Y_N$ is a vector of size L made up of additive noise samples. The estimated impulse response $r^k$ takes account of the propagation channel, shaping of the signal by the transmitter and filtering on reception.

The size of the problem can be reduced by a factor Q by integrating the codes $c^k$ in the responses $r^k$, i.e. by calculating the following convolution products for $1 \leq j \leq L' = Q+W-1$:

$$b_j^k = \sum_{q=1}^{Q} r_{j+1-q}^k \cdot c_q^k \quad (2)$$

Expression (1) then becomes:

$$Y = \sum_{k=1}^{K} \begin{pmatrix} b_1^k & 0 & \cdots & 0 \\ \vdots & \vdots & & \\ b_Q^k & 0 & & \\ b_{Q+1}^k & b_1^k & & \vdots \\ \vdots & & & \\ \vdots & b_Q^k & & \\ & b_{Q+1}^k & \ddots & 0 \\ b_{Q+W-1}^k & & & b_1^k \\ 0 & \vdots & & \vdots \\ & & & b_Q^k \\ & b_{Q+W-1}^k & & b_{Q+1}^k \\ \vdots & 0 & & \\ & & \ddots & \vdots \\ 0 & \cdots & 0 & b_{Q+W-1}^k \end{pmatrix} \begin{pmatrix} d_1^k \\ d_2^k \\ \vdots \\ d_n^k \end{pmatrix} + Y_N = \quad (3)$$

$$\sum_{k=1}^{K} B^k \cdot D^k + Y_N$$

The matrices $B^k$ of size L×n have a structure of the Toeplitz type along a diagonal having a slope Q (along the main diagonal if Q=1), i.e. if $\beta_{i,j}^k$ denotes the term located on the i-th row and j-th column of a matrix $B^k$, then $\beta_{ki+Q,j+1} = \beta_{i,j}^k$ where $1 \leq i \leq L-Q$ and $1 \leq j \leq n-1$. The terms of the matrix $B^k$ are given by: $\beta_{1,j}{}^k=0$ where $1\leq j\leq n$ ($B^k$ therefore has only zeros above its main diagonal, and even above its diagonal of slope Q); $\beta_{i,1}{}^k=0$ where $Q+W\leq i\leq L$ (band-matrix structure); and $\beta_{i,1}{}^k=b_i{}^k$ where $1\leq i<Q+W$.

In simple equalisers, the aim is merely to estimate the contribution of one channel, the contributions of the other channels being assimilated with noise. In other words, the receiver considers that K=1 after having determined the relevant response $B^1$. The linear system (3) reduces to $Y=B^1D^1+Y_N$ and can then be processed, using a method such as the Viterbi algorithm, which maximises the likelihood of the symbol estimations $D^1$, using an equaliser of reasonable complexity provided the length W of the channel response is not too big.

If the contributions of several channels have to be estimated, one option is to use several simple equalisers of the type described above, operating in parallel with the responses of different channels. Obviously, however, it is preferable to resolve the system (3) in one go where K>1 by trying to maximise the likelihood of the symbol estimates $d_p{}^k$ as far as possible. This is referred to as joint equalisation.

A matrix A of L=nQ+W−1 rows and N=nQ columns and a vector D of N discrete components are defined in order to express the vector Y in the form:

$$Y=AD+Y_N \quad (4)$$

One possible way of expressing the matrix and the vector D is as follows $$A = (B^K | \cdots | B^2 | B^1), \text{ and } D = \begin{pmatrix} D^K \\ \vdots \\ D^2 \\ D^1 \end{pmatrix} \quad (5)$$

In this organisation of the matrix A and vector D, the components are arranged channel by channel.

The matrix A and vector D of the linear system (4) can also be organised so that the components are arranged symbol by symbol. The matrix A will then have a blockwise Toeplitz structure, with a same block B of L'=Q+W−1 rows and K columns repeated n times with a offset of Q zero lines between adjacent blocks B, and the vector D is divided into corresponding blocks $D_i$ of a size K ($1\leq i\leq n$), i.e.

$$A = \begin{pmatrix} B & 0 & \cdots & 0 \\ \vdots & \ddots & & \vdots \\ 0 & \ddots & B & 0 \\ \vdots & & \ddots & B \\ 0 & \cdots & 0 & B \end{pmatrix}, \text{ and } D = \begin{pmatrix} D_n \\ \vdots \\ D_2 \\ D_1 \end{pmatrix} \quad (6)$$

$$\text{where } B = \begin{pmatrix} b_1^1 & b_1^2 & \cdots & b_1^k \\ b_2^1 & b_2^2 & \cdots & b_2^k \\ \vdots & \vdots & & \vdots \\ b_{Q+W-1}^1 & b_{Q+W-1}^2 & \cdots & b_{Q+W-1}^k \end{pmatrix} \text{ and } D_i = \begin{pmatrix} d_i^1 \\ d_i^2 \\ \vdots \\ d_i^K \end{pmatrix} \quad (7)$$

One conventional solution for resolving a system such as (4) is the least square method, by means of which the vector $\hat{D}$ is determined with N continuous components, which minimises the quadratic error $\epsilon=\|A\hat{D}-Y\|^2$. Discrete values of the components of the vector $\hat{D}$ relating to each channel are then obtained, often through a channel decoder. The solution $\hat{D}$ within the least square meaning is given by: $\hat{D}=(A^HA)^{-1}A^HY$, where $A^H$ denotes the conjugated transposed matrix of A. The problem is then reduced to inverting the positive defined Hermitian matrix $A^HA$. This inversion may be performed by means of various conventional algorithms directly (Gauss, Cholesky, . . . methods) or using iterative methods (Gauss-Seidel algorithms, gradient algorithms . . . ).

The estimation error $D-\hat{D}$ is equal to $(A^HA)^{-1}A^HY_N$, which demonstrates that the solution obtained is affected by a noise of variance:

$$\sigma^2=E(\|D-\hat{D}\|^2)=N_0 \times \text{Trace}[(A^HA)^{-1}] \quad (8)$$

where $N_0$ is the power spectral density of the noise. The noise is seen to be amplified if the matrix $A^HA$ is badly conditioned, i.e. when it has one or more eigenvalues close to 0.

This noise amplification is the main disadvantage of conventional resolution methods. In practice, the situations in which the matrix $A_H A$ is poorly conditioned arise frequently, especially in the presence of multiple propagation paths.

A relatively simple means is known of remedying this drawback to a certain extent by incorporating an interference residue in the solution, i.e. rather than using the optimum solution within the meaning of the least squares, by adopting instead the solution: $\hat{D}_{MMSE}=(A^HA+\hat{N}_0)^{-1}A^HY$, where $\hat{N}_0$ denotes an estimation of the noise spectral density, which the receiver must therefore compute. This method is known as MMSE (minimum mean square error). It allows the estimation variance to be reduced by introducing a bias.

An object of this invention is to alleviate the above-mentioned limitation of the known joint equalisation methods and to propose a sound compromise between the estimation reliability and the complexity of the equaliser.

SUMMARY OF THE INVENTION

Accordingly, the invention proposes a digital equalisation method for estimating, from a vector Y of L digital samples of a received signal, the discrete symbols of at least one transmitted signal forming part of the components of a vector D of a size N, wherein the vector Y may be decomposed as $Y=AD+Y_N$, where A is a matrix of L rows and N columns, determined beforehand from measurements of the response of at least one transmission channel, and $Y_N$ represents a vector of L noise samples. This method comprises the steps of:

determining an upper triangular matrix T of N rows and N columns and a vector Z of a size N such that the quadratic criteria $\|TX-Z\|^2$ and $\|AX-Y\|^2$ are minimum for the same vector X of size N;

dividing the vector Z into J blocks $Z_i$ ($1\leq i\leq J$) and the matrix T into J(J+1)/2 blocks $T_{i,j}$ ($1\leq j\leq i\leq J$), J being an integer greater than 1, the block $Z_i$ being made up of $N_i$ components of the vector Z, where $$\sum_{i=1}^{J} N_i = N,$$

and the block $T_{i,j}$ being made up of $N_i$ rows and $N_j$ columns, in the form:

$$Z = \begin{pmatrix} Z_J \\ \vdots \\ Z_2 \\ Z_1 \end{pmatrix} \text{ and } T = \begin{pmatrix} T_{J,J} & \cdots & \cdots & T_{J,2} & T_{J,1} \\ 0 & \ddots & & \vdots & \vdots \\ \vdots & \ddots & \ddots & \vdots & \vdots \\ 0 & & \ddots & T_{2,2} & T_{2,1} \\ 0 & \cdots & \cdots & 0 & T_{1,1} \end{pmatrix} \quad (9)$$

estimating $N_1$ of the discrete symbols as being the components of a vector $\hat{D}_1$ equal to that of the vectors $X_1$, made up of $N_1$ components taking the different possible values of the discrete symbols, which minimises the quantity $\|T_{1,1}X_1 - Z_1\|^2$.

The method exploits a priori the knowledge that the unknown variables to be estimated (the symbols of the vector D) assume discrete values. Taking this information into account a priori makes it possible to overcome the possible singularities of the linear system (4) to a certain extent.

Making the problem triangular, i.e. passing from matrix A to the triangular matrix T in the quadratic criterion to be minimised, simplifies the search for the optimum to a large extent by exploring the different possible discrete values of the symbols.

Sub-dividing the triangular matrix T into blocks enables iterative processing to be applied in order to successively estimate the symbols by blocks of size $N_i$. The method may thus include the following step, performed successively for each of the values of i from i=2 to i=imax, the integer imax being such that $2 \leq \text{imax} \leq J$:

estimating $N_i$ of the discrete symbols, as being the components of a vector $\hat{D}_i$ equal to that of the vectors $X_i$, made up of $N_i$ components taking the different possible values of the discrete symbols, which minimises the quantity $$\left\| T_{i,i}X_i + \sum_{j=1}^{i-1} T_{i,j}\hat{D}_j - Z_i \right\|^2.$$

If the vectors X of size N are broken down into J blocks $X_i$ of size $N_i$ in a manner similar to the vector Z $$\left( X = \begin{pmatrix} X_J \\ \vdots \\ X_1 \end{pmatrix} \right),$$

and with the notations $\epsilon_1 = \|T_{1,1}X_1 - Z_1\|^2$ and, for $2 \leq i \leq J$, $\epsilon_i = \|T_{i,i}X_i - \tilde{Z}_i\|^2$ where $$\tilde{Z}_i = Z_i - \sum_{j=1}^{i-1} T_{i,j}X_j,$$

the global quadratic criterion to be minimised is $$\|TX - Z\|^2 = \sum_{i=1}^{J} \epsilon_i.$$

Applying the minimisation block by block (i.e. by calculating $\hat{D}_1$ as the $X_1$ with discrete values which minimise $\epsilon_1$, then $\hat{D}_2$ as the $X_2$ with discrete values which minimise $\epsilon_2$ where $X_1 = \hat{D}_1$ in the expression of $\tilde{Z}_2$, then $\hat{D}_3$ as the $X_3$ with discrete values which minimise $\epsilon_3$ where $X_1 = \hat{D}_1$ and $X_2 = \hat{D}_2$ in the expression of $\tilde{Z}_3$, etc.) will certainly not lead to the optimum discrete solution $\hat{D}$ as a general rule, but the solution is very close to the optimal one and the complexity for solving the system is decreased very considerably.

The linear system is completely resolved if imax=J. It is also possible to perform a smaller number of iterations (at the limit one only), for example if the receiver needs to estimate the transmitted signals on only some of the channels. This being the case, the algebraic process leading from the matrix A to the matrix T enables characteristics of the response from other channels to be taken into account to a certain extent, which can procure a gain in the likelihood of the estimations.

In the method proposed by the invention as outlined above, each iteration leads to determination of a single vector $\hat{D}_i$. Since the solution obtained is generally sub-optimum, performance can be improved by retaining several candidate vectors for each iteration (on the basis of the discrete vectors for which the criterion $\epsilon_i$ assumes the lowest values) and by selecting at the end of the loop the set of candidate vectors that will have minimised the global criteria. In this alternative embodiment, after having determined the matrix T and the vector Z and having divided them into blocks, the following step is performed successively for each of the values of i from i=1 to i=imax, the integer imax being such that $2 \leq \text{imax} \leq J$:

determining a number $M_i \geq 1$ of estimation vectors $\hat{E}_i^{(m)}$, ($1 \leq m \leq M_i$), made up of $$P_i = \sum_{j=1}^{i} N_j$$

components whose values are among the different possible values of the discrete symbols, in the form $$\hat{E}_i^{(m)} = \begin{pmatrix} X_i^{(m)} \\ \hat{E}_{i-1}^{(m')} \end{pmatrix},$$

where $\hat{E}_{i-1}^{(m')}$ is an estimation vector of size $P_{i-1}$ determined at the preceding step if $i > 1$ ($1 \leq m \leq M_{i-1}$) and $X_i^{(m)}$ is a vector of size $N_i$, whereby said $M_i$ estimation vectors $\hat{E}_i^{(m)}$ minimise the quantity:

$$\delta_i^{(m)} = \delta_{i-1}^{(m')} + \|T_{i,i}X_i^{(m)} - \tilde{Z}_i^{(m')}\|^2 \quad (10)$$

where $\delta_0^{(m')} = 0$, $\tilde{Z}_1^{(m')} = Z_1$, and, for $i > 1$:

$$\tilde{Z}_i^{(m')} = Z_i - (T_{i,i-1} | \ldots | T_{i,2} | T_{i,1}) \hat{E}_{i-1}^{(m')} \quad (11)$$

The number $M_{imax}$ being equal to 1, $P_{imax}$ discrete symbols are then estimated by the components of the estimation vector $\hat{E}_{imax}^{(1)}$.

Another aspect of the present invention relates to a radio communication receiver comprising conversion means for producing successive vectors Y of L digital samples from a received radio signal, means for measuring the response of at least one transmission channel, so as to determine, for each of said vectors Y, a matrix A of L rows and N columns such that the vector Y can be decomposed as $Y = AD + Y_N$, where D is a vector of size N made up of discrete symbols of at least one signal transmitted and $Y_N$ represents a vector of L noise samples, and equalisation means implementing the above-defined digital equalisation method for estimating, on the basis of each vector Y, the discrete symbols of at least one transmitted signal forming part of the components of the corresponding vector D.

DESCRIPTION OF PREFERRED EMBODIMENTS

Figure 1:
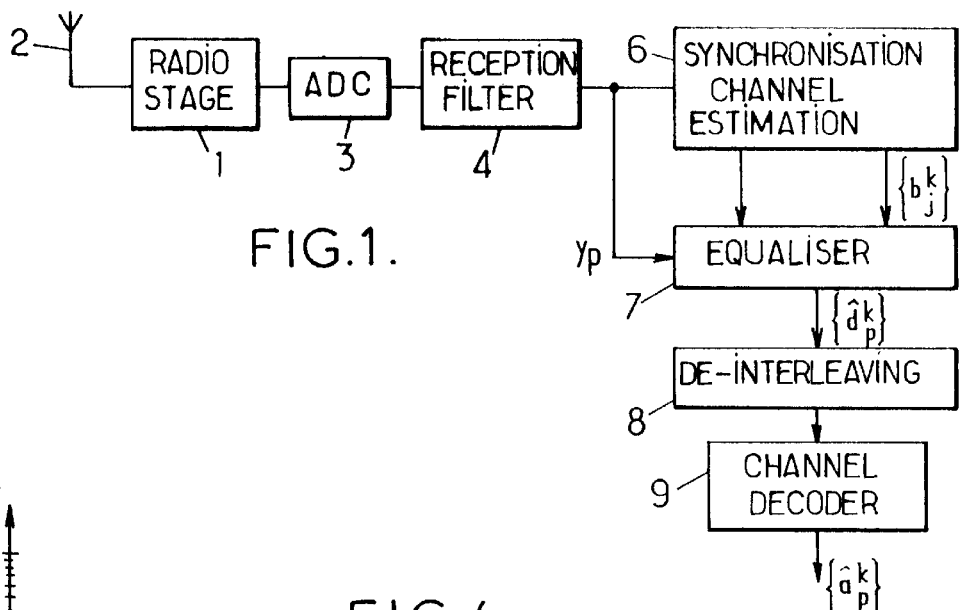
FIG. 1 is a block diagram of an example of a radio communication receiver as proposed by the invention.

It is assumed that the radio signals processed by the receiver of FIG. 1 are CDMA signals received on K logical channels differentiated by their respective spreading sequences $c^k$ as explained above.

The receiver illustrated in FIG. 1 comprises a radio stage 1 which receives the radio signal picked up by the antenna 2 and converts it into base band. The base band signal is digitised by an analogue-to-digital converter 3 and then applied to a reception filter 4. The filter 4 applies matched filtering corresponding to the signal shaping applied by the transmitter. It provides a digital signal as one complex sample per chip of the spreading sequences.

This digital signal is applied to a demodulator, comprising a synchronisation and channel estimation module 6 on the one hand and an equaliser 7 on the other.

Channel synchronisation and estimation are performed in a conventional manner, for example, by means of a synchronisation sequence included in each signal frame by the transmitter. Detection of this sequence, known to the receiver, enables the receiver to synchronise with the time structure of the transmitted frames on the one hand and the impulse response $r^k$ of the channel k, on which the frames are transmitted, to be estimated on the other. Having computed the impulse responses $r^k$ of the different channels taken into consideration, the module 6 computes the terms $b_j^k$ in accordance with equation (2) for $1 \leq k \leq K$ and $1 \leq j \leq L'=Q+W-1$, and applies them to the equaliser 7.

Figure 2:
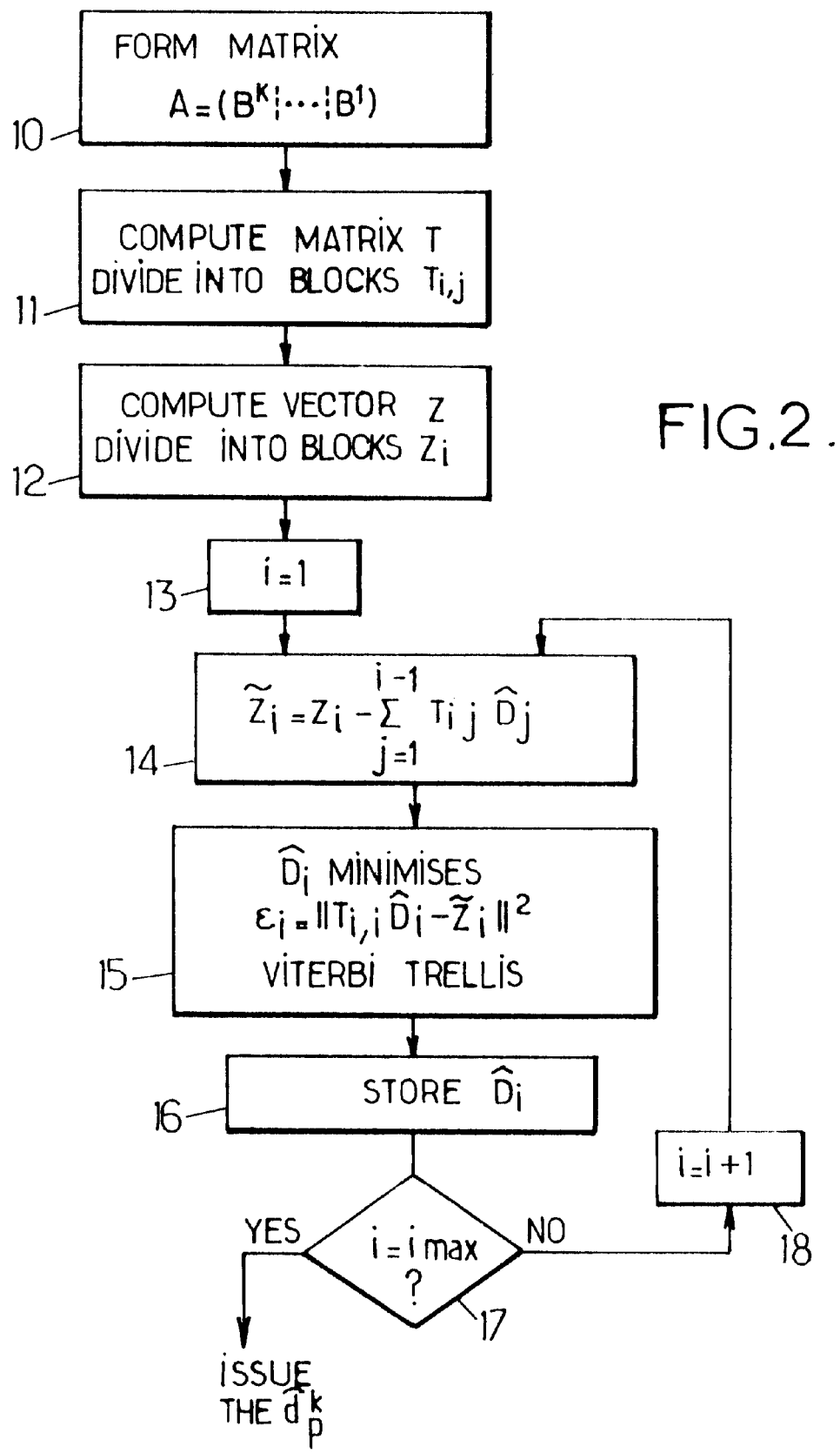
FIGS. 2 and 3 are flow charts showing the steps of two embodiments of the equalisation method proposed by the invention.

The equaliser 7 operates as shown in the flow chart of FIG. 2, for example, so that each synchronised frame of the received signal is processed, being in the form of a vector $$Y = \begin{pmatrix} y_1 \\ \vdots \\ y_L \end{pmatrix}$$

where $L=nQ+W-1$ taking the notations set out above.

In a first step 10, the equaliser 7 sets up the matrix A in the manner stated in equations (5) above by juxtaposing K blocks $B^k$ of L rows and N=nQ columns, defined on the basis of the terms $b_j^k$ as stated in equation (3).

The equaliser 7 then computes an upper triangular matrix T of size N×N and a vector Z of a size N such that the quadratic criteria $\|TX-Z\|^2$ and $\|AX-Y\|^2$ are linked to one another by an increasing function independent of the vector X of size N ($X \in \mathbb{C}^N$), so that two criteria on any sub-set of $\mathbb{C}^N$ (in particular on the sub-set $\Phi^N$, where $\Phi$ denotes the discrete set of possible values of the symbols $d_k^p$ are minimised by the same vector X. Several methods may be used to compute this matrix T and this vector Z.

The Cholesky method in particular may be used to factorise the positive defined Hermitian matrix $A^H A$ in the form $$A^H A = \Gamma^H \Gamma \quad (12)$$

where $\Gamma$ is an upper triangular matrix. The matrix T may be taken as being proportional to the Cholesky factor $\Gamma$ verifying equation (12), multiplied by an arbitrary complex coefficient $\alpha \neq 0$ (for example $\alpha=1$), in which case the matrix $A^H A$ is proportional to $T^H T$ in a ratio of $1/|\alpha|^2$:

$$A^H A = \frac{T^H T}{|\alpha|^2} \quad (13)$$

There are a number of conventional algorithms which may be used to effectively perform the Cholesky factorization of a positive defined Hermitian matrix. For example, reference may be made to the work by Golub & Loane: "Matrix Computation", published by Baltimore M. B Having thus computed the matrix T at step 11, the equaliser 7 sub-divides it into blocks $T_{i,j}$ of size $N_i \times N_j$ as stated in equation (9).

It is of advantage to apply the division into blocks so that J=K and $N_i=n$ where $1 \leq i \leq J$. Given the chosen organisation of the matrix A (form (5)), the matrix $A^H A$ will have blocks of a size n×n accordingly on its main diagonal, equal respectively to the Toeplitz matrices $(B^k)^H B^k$. Under these conditions, all the diagonal blocks $T_{i,i}$ of the matrix T are top triangular matrices of size n×n which, with a very good approximation, will have a Toeplitz structure along their main diagonal.

At step 12, the equaliser 7 computes the vector Z as follows:

$$Z = |\alpha|^2 (T^H)^{-1} A^H Y \quad (14)$$

which requires the lower triangular matrix $T^H$ to be inverted. Such a matrix can be inverted by various numerical methods which can be implemented very rapidly.

Since the matrix T and the vector Z are chosen in accordance with equations (13) and (14), it can be verified that $\|TX-Z\|^2 = |\alpha|^2 \|AX-Y\|^2 + \beta$, where $|\alpha|^2 > 0$ and $\beta = \|Z\|^2 - \|\alpha Y\|^2$ are real numbers independent of X. This demonstrates that the quadratic criteria $\|TX-Z\|^2$ and $\|AX-Y\|^2$ are minimised by the same vector X.

At step 12, the vector Z is also sub-divided into blocks $Z_i$ ($1 \leq i \leq J$) of size $N_i$ as stated in equation (9). The equaliser then proceeds to a computation loop, initialised by i=1 at step 13 in order to estimate the symbols of the vector D by successive blocks $D_i$ of size $N_i$. The vector of $N_i$ estimations obtained at the i-th iteration of this loop is written $\hat{D}_i$.

Each iteration commences, at step 14, by computing a vector $\tilde{Z}_i$. This vector $\tilde{Z}_i$ of size $N_i$ is equal to $Z_i$ where i=1 and to $$\tilde{Z}_i = Z_i - \sum_{j=1}^{i-1} T_{i,j} \hat{D}_j$$

where i>1.

At step 15, the equaliser computes the estimation vector $\hat{D}_i$ as being that of the vectors $X_i$ of size $N_i$, the components of which assume the different possible values of the discrete symbols $d_p^k$ ($X_i \in \Phi^{N_i}$), which minimises the quadratic criterion $\epsilon_i = \|T_{i,i} X_i - \tilde{Z}_i\|^2$.

In the preferred situation where $J=K$ and $N_1 = \ldots = N_J = n$, the fact that an approximation of the block $T_{i,i}$ can be made by an upper triangular matrix having a Toeplitz structure along its main diagonal enables the minimisation to be performed at step 15 using a sequential trellis algorithm, supplying the optimum solution within the meaning of maximum likelihood, for example the Viterbi algorithm. The complexity of the Viterbi trellis corresponds to that required to equalise a single channel, with n successive symbols to be estimated and a impulse response length in the order of W/Q symbols. It should be pointed out that the method of jointly equalising K channels as proposed by the invention does not involve any excessive complexity as compared with equalising the different channels separately. The additional complexity is mainly limited to operations which can be effected rapidly, namely, factorisation of the matrix $A^H A$ by the Cholesky or a similar method to compute the matrix T, inversion of the triangular matrix $T^H$, and the linear combinations of the steps 14.

The i-th iteration in the loop ends at step 16 with memorisation of the estimation vector obtained $\hat{D}_i$. The latter corresponds to an estimation of the vector $D^k$ defined in equation (3) where k=i, i.e. it contains the estimates of the n symbols $d_1^k$ to $d_n^k$ of the frame transmitted on channel k=i:

$$\hat{D}_i = \hat{D}_k = \begin{pmatrix} \hat{d}_1^k \\ \vdots \\ \hat{d}_n^k \end{pmatrix}.$$

The index i is compared with the predefined number imax of iterations in the loop at step 17. If i<imax, the index i is incremented at step 18 before reverting to step 14 for the iteration relating to the next channel. When i=imax, the equaliser has terminated the computations for the current frame and it issues the estimations $\hat{d}_p^k$ of the symbols relating to the different channels. If the receiver needs to estimate the symbols for each of the K channels, then imax=J=K is applied.

In general, the symbols $d_p^k$ emitted on a channel are supplied by a channel encoding device which protects the transmitted data symbols $a_p^k$ against errors. In the case of mobile radio channels, the actual coding of the channel, which introduces redundancy in an error detection and/or error correction code, is generally followed by interleaving in order to disperse the errors which frequently occur in packets on this type of channel. At the receiver, the estimated symbols $\hat{d}_p^k$ issued for each channel k by the equaliser 7 are forwarded to a de-interleaving module 8 (FIG. 1) and then to a channel decoder 9 which uses the coding redundancy to detect and correct any transmission errors and finally supply the estimations $\hat{a}_p^k$ of the relevant information symbols for the channel k.

The embodiment illustrated in FIG. 3 essentially differs from that of FIG. 2 in the following two aspects:

the matrix A is organised in the manner stated in equations (6) and (7); and in each iteration i, a number $M_i$ of estimation vectors is retained for which the quadratic criterion has the $M_i$ smallest values.

The fact of taking $M_i \geq 1$ estimation vectors of a size $$P_i = \sum_{j=1}^{i} N_j$$

during an iteration i improves optimisation since it avoids eliminating certain symbol values which might appear sub-optimum during the iteration in which these symbols are estimated but which might be regarded as better a posteriori against the global criterion $\|TX-Z\|^2$. The extreme case where $M_1 = \ldots = M_{imax} = 1$ corresponds to the preceding case.

Figure 3:
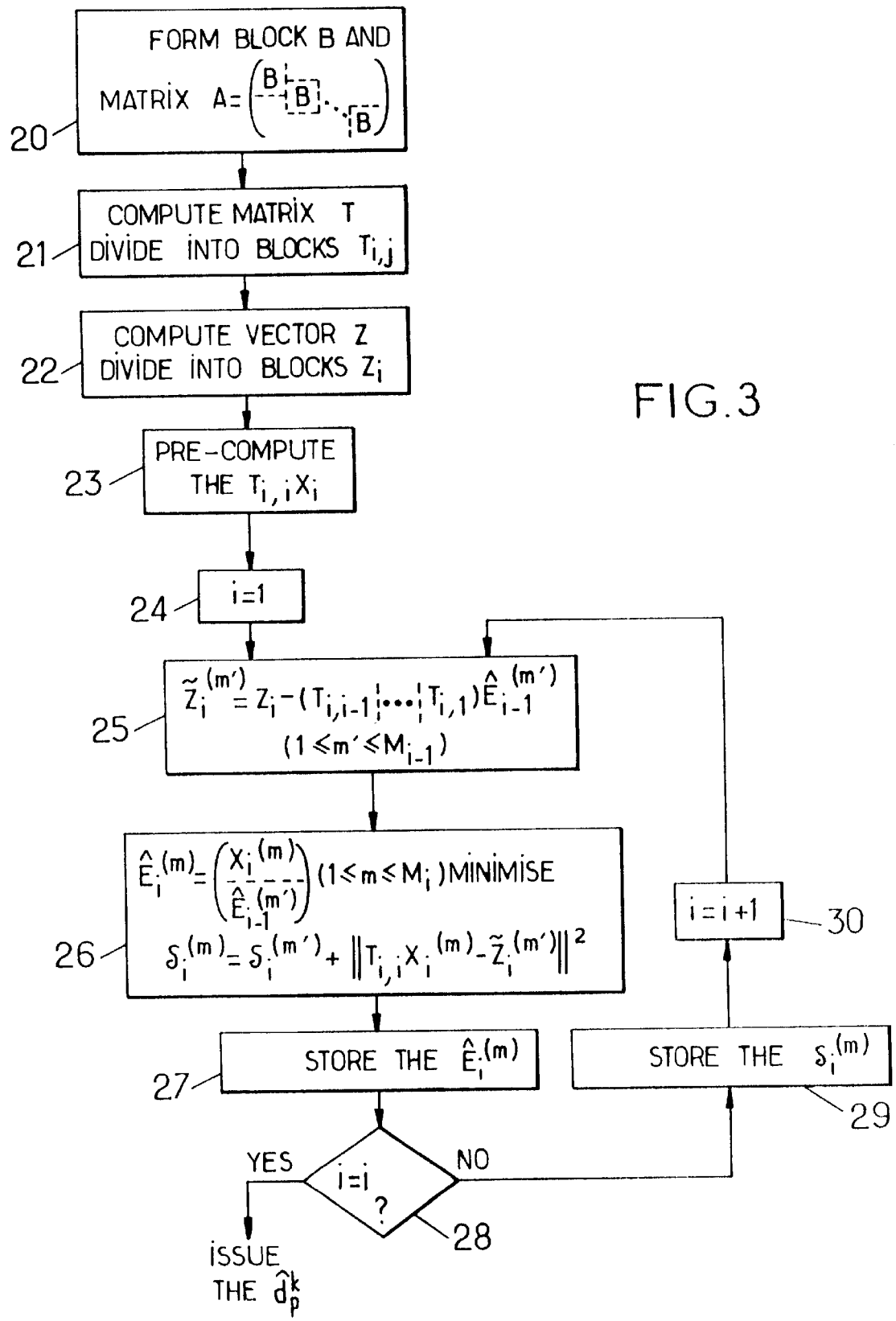

In the embodiment illustrated in FIG. 3, the equaliser 7 starts at step 20 by forming the block B of size L'×K and the matrix A of size L×N in accordance with equations (6) and (7). At steps 21 and 22, it then proceeds to compute T and Z and divide them into blocks $T_{i,j}$ and $Z_i$ in the same way as in steps 11 and 12 described with reference to FIG. 2.

At this point, it is of advantage to divide the blocks so that J=n and $N_i=K$ where $1 \leq i \leq J$. In view of the organisation chosen for the matrix A (format (6)), the matrix $A^H A$ therefore has identical blocks of a size K×K on its main diagonal, equal to the matrix $B^H B$. Under these conditions, all the diagonal blocks $T_{i,i}$ of the matrix T are identical with a very good approximation (a negligible boundary effect may cause the diagonal blocks closest to the top left-hand corner of the matrix T to vary slightly (i∓J)).

This being the case, as shown at step 23, all the terms of the form $T_{i,i} X_i$ ($X_i \epsilon \Phi^K$) can be computed in advance and will then be used in the loop, by taking a single matrix $T_{i,i}$ equal to $T_{1,1}$, i.e. proportional to the Cholesky factor of the matrix $B^H B$ ($T_{i,i}{}^H T_{i,i} = |\alpha|^2 \cdot B^H B$). There will be two of these terms in the case of binary symbols.

The optimisation loop is initialised by i=1 at step 24. At step 25, the equaliser computes $M_{i-1}$ vectors $\tilde{Z}_i^{(m')}$ in accordance with equation (11) for $1 \leq m' \leq M_{i-1}$. This step 25 has no object during the first iteration ($M_0 = 0$ and $\tilde{Z}_1^{(0)} = Z_1$).

At step 26, the equaliser scans the pre-computed terms $T_{i,i} X_i$ and, if i>1, the $M_{i-1}$ estimation vectors $\hat{E}_{i-1}^{(m')}$ determined in the preceding iteration, to determine which are the $M_i$ estimation vectors $\hat{E}_i^{(m)}$ ($1 \leq m \leq M_i$) of size $P_i$ and of the form $$\hat{E}_i^{(m)} = \begin{pmatrix} X_i^{(m)} \\ \hat{E}_{i-1}^{(m')} \end{pmatrix}$$

(for i=1: $\hat{E}_1^{(m)} = X_1$), which minimises the criterion $\delta_i^{(m)}$ given by equation (10) (for i=1, the criterion $\delta_1^{(m)} = \|T_{1,1} X_1^{(m)} - Z_1\|$).

The i-th iteration in the loop ends at step 27 when the $M_i$ estimation vectors obtained $\hat{E}_i^{(m)}$ are stored. These contain provisional estimations of the last $P_i$ symbols of the vector D organised as in equations (6). As long as i<imax (test 28), the $M_i$ minimum criteria $\delta_i^{(m)}$ ($1 \leq m \leq M_i$) are also stored in memory at step 29 for use in the next iteration, after which the index i is incremented at step 30 before returning to step 25 for the next iteration. When i=imax, the equaliser has terminated the computation for the current frame and issues the estimations $\hat{d}_p^k$ of the symbols relating to the different channels. These estimations are extracted from the vector $\hat{E}_{imax}^{(1)}$, it being sufficient to take $M_{imax} = 1$. If the receiver needs to estimate each of the n symbols of each frame, one takes imax=J=n.

Figure 4:
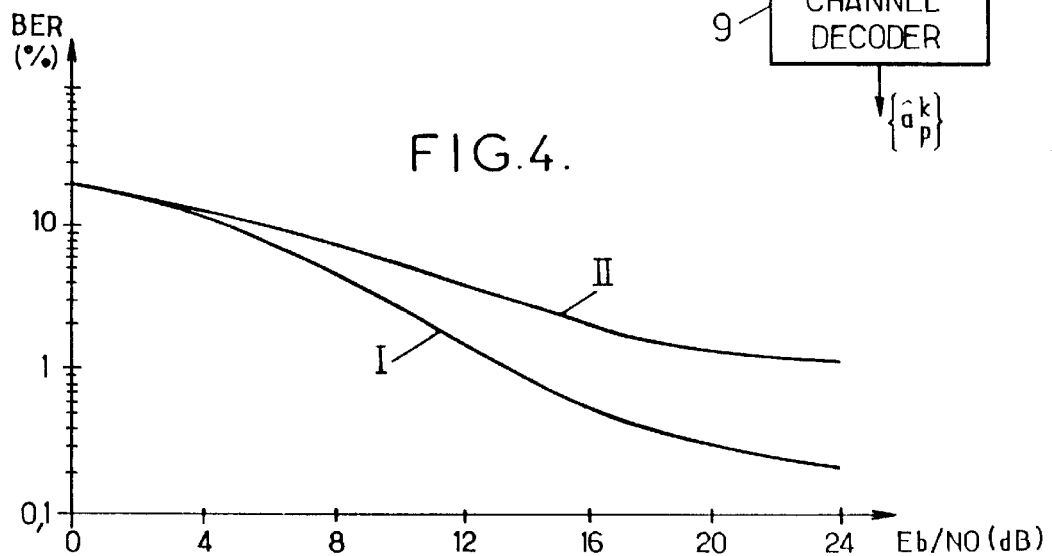
FIG. 4 is a diagram illustrating the performance of the method in the absence of channel encoding/decoding.

FIG. 4 illustrates the effectiveness of joint equalisation using the method outlined above (curve I) compared with joint equalisation using the conventional MMSE method (curve II), showing the dependency between the bit error rate BER observed in the estimations $\hat{d}_p^{\ k}$ of the symbols $d_p^{\ k}$ (without channel encoding/decoding), expressed in %, and the ratio Eb/NO between the energy per bit and the noise power spectral density expressed in decibels. These curves were obtained by computer simulation under conditions representative of a cellular mobile telephone application, namely:

uplink simulation at 2 GHz to a receiving base station from K=8 mobile stations, each having a individual spreading sequence $c^k$ of length Q=8;

the modulation used is of the BPSK type, the symbols $d_p^{\ k}$ and the chips $c_q^{\ k}$ being binary (±1);

the frames consist of n=56 symbols of a duration of 3.69 μs;

channel of the VEHICULAR A type with a mobile speed of 100 km/h.

In these simulations, the method proposed by the invention and described above was used with format (6) for matrix A, where J=n=imax=56, $N_1$= ... $N_j$=K=8 and $M_1$= ... =$M_j$=1. FIG. 4 demonstrates the considerable improvement which can be achieved by joint equalisation as proposed by the invention.

Figure 5:
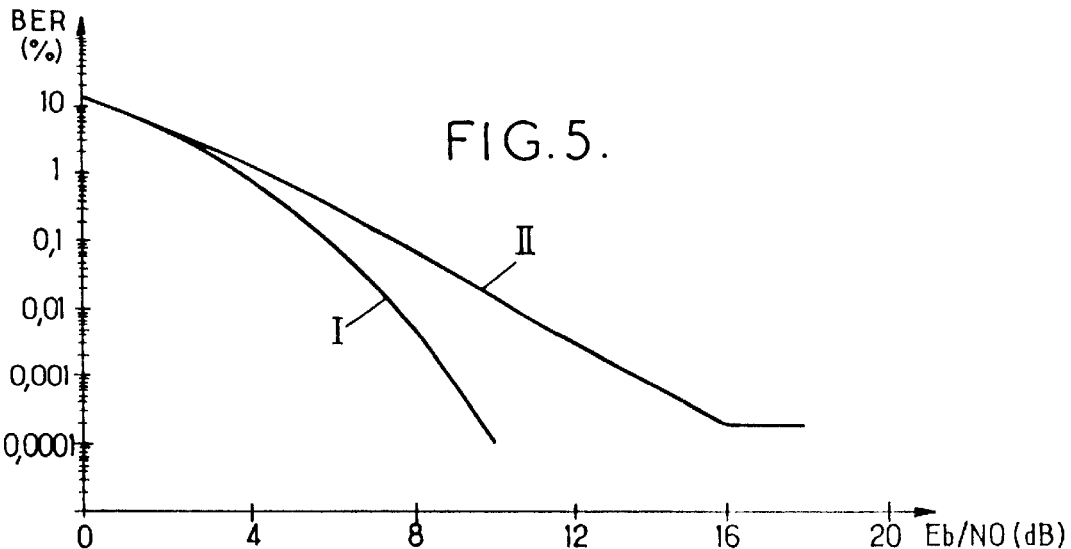
FIG. 5 is a diagram similar to that of FIG. 4 with channel encoding/decoding.

FIG. 5 sets out the results obtained during the same simulations in terms of bit error rate BER observed in the estimates $\hat{a}_p^{\ k}$ of the symbols $a_p^{\ k}$, where using channel coding based on a rate 1/3 convolutional code with constraint length 9 and interleaving of the symbols transmitted over a period corresponding to four frames. For a BER of 0.1%, the power gain is in the order of 2 dB.

Various algebraic methods other than the above-mentioned Cholesky factorisation may be used to provide the triangular matrix T and the vector Z so that the same vector X minimises the two quadratic criteria $\|TX-Z\|^2$ and $\|AX-Y\|^2$.

For example, the matrix A may also be triangularized using the Householder method (see above-mentioned work by Golub & Loane). This method provides a unitary matrix U of size L×L such that the product UA, which is a matrix L×N, is of the form:

$$UA = \begin{pmatrix} X & X & \cdots & X \\ 0 & X & & \\ \vdots & 0 & \ddots & \\ & & \ddots & X \\ & & & 0 \\ \vdots & & & \vdots \\ 0 & \cdots & \cdots & 0 \end{pmatrix} = \begin{pmatrix} \Gamma' \\ 0 \end{pmatrix} \quad (15)$$

i.e. formed by a first block Γ'=of size N×N having n upper triangular structure and by a second block of L−N rows of zeros. Accordingly, we can take T=αΓ', where α is an arbitrary complex coefficient that is not zero (for example α=1). By sub-dividing the vector UY of size L into two blocks Y' and Y" of sizes N and L−N respectively, i.e.

$$UY = \begin{pmatrix} Y' \\ Y'' \end{pmatrix},$$

it is possible to select Z=αY'. With this choice too, the quadratic criteria $\|TX-Z\|^2$ and $\|AX-Y\|^2$ are still linked by a relation $\|TX-Z\|^2=|\alpha|^2\|AX-Y\|^2+\beta$, where $|\alpha|^2>0$ and $\beta=-\|\alpha Y''\|^2$ are real numbers independent of X. The above-described method can therefore be applied in comparable conditions.

On the other hand, it should be pointed out that the upper triangular matrix T could be replaced by a lower triangular matrix, by applying the same approach. This replacement can be made simply by adapting the algebraic method used to move from matrix A to matrix T or alternatively by inverting the order of the components in the vectors Y and D.

The field in which the method described above can be applied is not limited to CDMA radio communications.

For example, still within the field of radio communications, the specific case where Q=1 might be considered in the explanations given above. In this case, if the matrix A is constructed in accordance with expression (5), the number L of rows in the matrix A and blocks $B^k$ is equal to n+W−1, where W is the length of the estimation of the impulse response of a channel, expressed by the number of symbols of the signals, each of the blocks $B^k$ having a Toeplitz structure along the main diagonal. If the matrix A is constructed in accordance with format (6), the number L' of rows of the block B corresponds to the length W of the estimated channel impulse response, expressed as a number of symbols of the signals, the repeated blocks B being offset by one row.

In this case, the system is reduced to one with no spectrum spreading. The method will then allow synchronous interference to be taken into account by the receiver, a phenomenon which may be encountered in particular in cellular networks based on time and/or frequency division multiple access (TDMA/FDMA). Let us consider a cellular network of the GSM type, for example (combined TDMA/FDMA), in which the base stations of a set of cells covering a given geographical zone would be synchronised. A distinction may be made between two cells of this set re-using the same frequencies on the basis of the synchronisation sequences incorporated in the frames of the transmitted signals. These different sequences allow a separate evaluation of the impulse responses of channels sharing the same carrier at the same time and on which signals from different cells are transmitted. In this case, the method described above may be used to equalise the channel relevant to the receiver by processing the transmitted signal on the other channel(s) not as noise, as is usually the case, but as signals constructed in the manner prescribed in the radio communication system. The symbols carried by these latter signals are not necessarily estimated explicitly (it is possible to take imax<J), since they are implicitly taken into account in the algebraic transformation leading to the triangular matrix T.

Generally speaking, the method proposed by the invention can be applied whenever the symbols which have to be estimated are components of a vector D such that a received signal vector Y can be modelled by a linear system of format (4) (see J. G. Proakis: "Digital Communications", published by MacGraw-Hill, NewYork, 1982).

We claim:

1. A digital equalisation method for estimating, from a vector Y of L digital samples of a received signal, discrete symbols of at least one transmitted signal forming part of the components of a vector D of a size N, L and N being integers greater than 1, wherein the vector Y is of the form Y=AD+$Y_N$, where A is a matrix of L rows and N columns, determined beforehand from measurements of a response of at least one transmission channel, and $Y_N$ represents a vector of L noise samples, the method comprising the steps of:

determining an upper triangular matrix T of N rows and N columns and a vector Z of a size N such that two quadratic criteria $\|TX-Z\|^2$ and $\|AX-Y\|^2$ are minimum for a same vector X of size N;

dividing the vector Z into J blocks $Z_i$ ($1 \leq i \leq J$) and the matrix T into $J(J+1)/2$ blocks $T_{i,j}$ ($1 \leq j \leq i \leq J$), J being an integer greater than 1, the block $Z_i$ being made up of $N_i$ components of the vector Z, the $N_i$'s being integers such that $$\sum_{i=1}^{J} N_i = N,$$

and the block $T_{i,j}$ being made up of $N_i$ rows and $N_j$ columns, in the form:

$$Z = \begin{pmatrix} Z_J \\ \vdots \\ \vdots \\ Z_2 \\ Z_1 \end{pmatrix} \text{ and } T = \begin{pmatrix} T_{J,J} & \cdots & \cdots & T_{J,2} & T_{J,1} \\ 0 & \ddots & & \vdots & \vdots \\ \vdots & \ddots & \ddots & \vdots & \vdots \\ 0 & & \ddots & T_{2,2} & T_{2,1} \\ 0 & \cdots & \cdots & 0 & T_{1,1} \end{pmatrix};$$

estimating $N_1$ of the discrete symbols as being the components of a vector $\hat{D}_1$ equal to that of the vectors $X_1$, made up of $N_1$ components taking the different possible values of the discrete symbols, which minimises the quantity $\|T_{1,1}X_1 - Z_1\|^2$.

2. A method as claimed in claim 1, further comprising the following step, performed successively for each of the values of i from i=2 to i=imax, the integer imax being such that $2 \leq imax \leq J$:

estimating $N_i$ of the discrete symbols, as being the components of a vector $\hat{D}_i$ equal to that of the vectors $X_i$, made up of $N_i$ components taking the different possible values of the discrete symbols, which minimises the quantity $$\left\| T_{i,i}X_i + \sum_{j=1}^{i-1} T_{i,j}\hat{D}_j - Z_i \right\|^2.$$

3. A method as claimed in claim 2, wherein imax=J.

4. A method as claimed in claim 1, Wherein the matrix A and vector D are organised so that the matrix A has a blockwise Toeplitz structure with a same block B of L' rows and K columns repeated n times, K being the number of signals transmitted and n being a number of discrete signals of a frame of each of the K signals, the vector D being divided into corresponding blocks $D_i$ of a size K:

$$A = \begin{pmatrix} B & 0 & \cdots & 0 \\ & \ddots & & \vdots \\ 0 & & B & 0 \\ \vdots & & \ddots & B \\ 0 & \ddots & 0 & \end{pmatrix}, \text{ and } D = \begin{pmatrix} D_n \\ \vdots \\ D_2 \\ D_1 \end{pmatrix}$$

and wherein the values J=n and $N_1 = \ldots = N_J = K$ are used for dividing the vector Z and the matrix T.

5. A method as claimed in claim 4, wherein the number L' of rows in block B corresponds to the length W of an estimation of the channel impulse response, expressed as a number of symbols of the signals, the repeated blocks B being offset by one row.

6. A method as claimed in claim 4, wherein the signals are transmitted by spread spectrum radio by means of respective spreading sequences modulating the symbols and having a rate Q times greater than that of the symbols, and wherein the number L' of rows in block B is equal to Q+W−1, where W is the length of an estimation of the impulse response of a channel, expressed as a number of samples of the spreading sequences, the repeated blocks B being offset by Q rows.

7. A method as claimed in claim 4, the diagonal blocks $T_{i,i}$ of the matrix ($1 \leq i \leq J$) are identical and such that $T_{i,i}^H T_{i,i}$ is proportional to $B^H B$, and wherein the vectors $T_{i,i}X_i$ are calculated in advance, $X_i$ being a vector of size K whose components assume the different possible values of the discrete symbols.

8. A method as claimed in claim 2, wherein the matrix A and vector D are organised so that the matrix A is made of a juxtaposition of K blocks $B^k$ of L rows and n columns, each block $B^k$ having Toeplitz structure, with zeros above its main diagonal, K being the number of signals transmitted and n being a number of discrete symbols in a frame of each of the K signals, the vector D being divided into corresponding blocks $D^k$ of size n:

$$A = (B^K | \cdots | B^2 | B^1), \text{ and } D = \begin{pmatrix} D^K \\ \vdots \\ D^2 \\ D^1 \end{pmatrix}$$

and wherein the values J=K and $N_1 = \ldots = N_J = N$ are used to divide the vector Z and the matrix T.

9. A method as claimed in claim 8, wherein the number L of rows in the matrix A and the blocks $B^k$ is equal to n+W−1, where W is the length of an estimation of the impulse response of a channel, expressed as a number of symbols of the signals, each of the blocks $B_k$ having a Toeplitz structure along the main diagonal.

10. A method as claimed in claim 8, wherein the signals are transmitted by spread spectrum radio by means of respective spreading sequences modulating the symbols and having a rate Q times greater than that of the symbols and wherein the number L of rows in the matrix A and blocks $B^k$ is equal to nQ+W−1, where W is the length of an estimation of the impulse response of a channel, expressed as a number of samples of the spreading sequences, each of the blocks $B^k$ having a Toeplitz structure along a diagonal of slope Q.

11. A method as claimed in claim 8 wherein each vector $\hat{D}_i$ is computed by means of a maximum likelihood algorithm.

12. A method as claimed in claim 11, wherein said maximum likelihood algorithm is the Viterbi algorithm.

13. A method as claimed claim 1, wherein the upper triangular matrix T is determined by a Cholesky factorisation of the positive defined Hermitian matrix $A^H A$, the matrix $A^H A$ being proportional to $T^H T$, and wherein the vector Z is proportional to $(T^H)^{-1} A^H Y$.

14. A method as claimed in claim 1, wherein the upper triangular matrix T is determined by triangularizing the matrix A using the Householder method providing a unitary matrix U of L rows and L columns such that the product UA is a matrix of L rows and N columns made up of a first block of N rows and N columns having a triangular structure and a second block L−N rows of zeros, the matrix T being taken as being proportional to said first block, and wherein the vector Z is taken as being proportional to a block of size N extracted from a vector UY.

15. A digital equalisation method for estimating, from a vector Y of L digital samples of a received signal, discrete symbols of at least one transmitted signal forming part of the components of a vector D of a size N, L and N being integers greater than 1, wherein the vector Y is of the form Y=AD+ $Y_N$, where A is a matrix of L rows and N columns, determined beforehand from measurements of a response of at least one transmission channel, and $Y_N$ represents a vector of L noise samples, the method comprising the steps of:

determining an upper triangular matrix T of N rows and N columns and a vector Z of a size N such that two quadratic criteria $\|TX-Z\|^2$ and $\|AX-Y\|^2$ are minimum for a same vector X of size N;

dividing the vector Z into J blocks $Z_i (1 \leq i \leq J)$ and the matrix T into J(J+1)/2 blocks $T_{i,j}$ $(1 \leq j \leq i \leq J)$, J being an integer greater than 1, the block $Z_i$ being made up of $N_i$ components of the vector Z, the $N_i$'s being integers such that $$\sum_{i=1}^{J} N_i = N,$$

and the block $T_{i,j}$ being made up of $N_i$ rows and $N_j$ columns, in the form:

$$Z = \begin{pmatrix} Z_J \\ \vdots \\ Z_2 \\ Z_1 \end{pmatrix} \text{ and } T = \begin{pmatrix} T_{J,J} & \cdots & \cdots & T_{J,2} & T_{J,1} \\ 0 & \ddots & & \vdots & \vdots \\ \vdots & \ddots & \ddots & \vdots & \vdots \\ 0 & & \ddots & T_{2,2} & T_{2,1} \\ 0 & \cdots & \cdots & 0 & T_{1,1} \end{pmatrix};$$

and the following step, performed successively for each integer value of i from i=1 to i=imax, the integer imax being such that $2 \leq \text{imax} \leq J$:

determining a number $M_i \geq 1$ of estimation vectors $\hat{E}_i^{(m)}$, $(1 \leq m \leq M_i)$, made up of $$P_i = \sum_{j=1}^{i} N_j$$

components whose values are among the different possible values of the discrete symbols, in the form $$\hat{E}_i^{(m)} = \begin{pmatrix} X_i^{(m)} \\ \hat{E}_{i-1}^{(m')} \end{pmatrix},$$

where $\hat{E}_{i-1}^{(m')}$ is an estimation vector of size $P_{i-1}$ determined at the preceding step if i>1 $(1 \leq m \leq M_{i-1})$ and $X_i^{(m)}$ is a vector of size $N_i$, whereby said $M_i$ estimation vectors $\hat{E}_i^{(m)}$ minimise the quantity $\delta_i^{(m)} = \delta_{i-1}^{(m')} + \|T_{i,i}X_i^{(m)} - \tilde{Z}_i^{(m')}\|^2$, where $\delta_0^{(m')} = 0$, $\tilde{Z}_1^{(m')} = Z_1$, and $\tilde{Z}_i^{(m')} = Z_i - (T_{i,i-1}|\cdots|T_{i,2}|T_{i,1}) \hat{E}_{i-1}^{(m')}$ for i>1, and wherein, the number $M_{imax}$ being equal to 1, $P_{imax}$ discrete symbols are estimated by the components of the estimation vector $\hat{E}_{imax}^{(1)}$.

16. A method as claimed in claim 15, wherein imax=J.

17. A method as claimed in claim 15, wherein the matrix A and vector D are organised so that the matrix A has a blockwise Toeplitz structure with a same block B of L' rows and K columns repeated n times, K being the number of signals transmitted and n being a number of discrete signals of a frame of each of the K signals, the vector D being divided into corresponding blocks $D_i$ of a size K:

$$A = \begin{pmatrix} B & 0 & \cdots & 0 \\ \vdots & \ddots & \ddots & \vdots \\ 0 & \ddots & B & 0 \\ \vdots & & \ddots & \ddots & 0 \\ & & & & B \\ 0 & \ddots & & 0 & \end{pmatrix}, \text{ and } D = \begin{pmatrix} D_n \\ \vdots \\ D_2 \\ D_1 \end{pmatrix}$$

and wherein the values J=n and $N_1 = \ldots = N_J = K$ are used for dividing the vector Z and the matrix T.

18. A method as claimed in claim 17, wherein the number L' of rows in block B corresponds to the length W of an estimation of the channel impulse response, expressed as a number of symbols of the signals, the repeated blocks B being offset by one row.

19. A method as claimed in claim 17, wherein the signals are transmitted by spread spectrum radio by means of respective spreading sequences modulating the symbols and having a rate Q times greater than that of the symbols, and wherein the number L' of rows in block B is equal to Q+W−1, where W is the length of an estimation of the impulse response of a channel, expressed as a number of samples of the spreading sequences, the repeated blocks B being offset by Q rows.

20. A method as claimed in claim 17, wherein the diagonal blocks $T_{i,i}$ of the matrix $(1 \leq i \leq J)$ are identical and such that $T_{i,i}^H T_{i,i}$ is proportional to $B^H B$, and wherein the vectors $T_{i,i} X_i$ are calculated in advance, $X_i$ being a vector of size K whose components assume the different possible values of the discrete symbols.

21. A method as claimed in claim 15, wherein the matrix A and vector D are organised so that the matrix A is made of a juxtaposition of K blocks $B^k$ of L rows and n columns, each block $B^k$ having a Toeplitz structure, with zeros above its main diagonal, K being the number of signals transmitted and n being a number of discrete symbols in a frame of each of the K signals, the vector D being divided into corresponding blocks $D^k$ of size n:

$$A = ( B^K | \cdots | B^2 | B^1 ), \text{ and } D = \begin{pmatrix} D^K \\ \vdots \\ D^2 \\ D^1 \end{pmatrix}$$

and wherein the values J=K and $N_1 = \ldots = N_J = N$ are used to divide the vector Z and the matrix T.

22. A method as claimed in claim 21, wherein the number L of rows in the matrix A and the blocks $B^k$ is equal to n+W−1, where W is the length of an estimation of the impulse response of a channel, expressed as a number of symbols of the signals, each of the blocks $B_k$ having a Toeplitz structure along the main diagonal.

23. A method as claimed in claim 21, wherein the signals are transmitted by spread spectrum radio by means of respective spreading sequences modulating the symbols and having a rate Q times greater than that of the symbols and wherein the number L of rows in the matrix A and blocks $B^k$ is equal to nQ+W−1, where W is the length of an estimation of the impulse response of a channel, expressed as a number of samples of the spreading sequences, each of the blocks $B^k$ having a Toeplitz structure along a diagonal of slope Q.

24. A method as claimed in claim 21, wherein each estimation vector $\hat{E}_i^{(m)}$ is computed by means of a maximum likelihood algorithm.

25. A method as claimed in claim 24, wherein said maximum likelihood algorithm is the Viterbi algorithm.

26. A method as claimed in claim 15, wherein the upper triangular matrix T is determined by a Cholesky factorisation of the positive defined Hermitian matrix $A^H A$, the matrix $A^H A$ being proportional to $T^H T$, and wherein the vector Z is proportional to $(T^H)^{-1} A^H Y$.

27. A method as claimed in claim 15, wherein the upper triangular matrix T is determined by triangularizing the matrix A using the Householder method providing a unitary matrix U of L rows and L columns such that the product UA is a matrix of L rows and N columns made up of a first block of N rows and N columns having a triangular structure and a second block of L-N rows of zeros, the matrix T being taken as being proportional to said first block, and wherein the vector Z is taken as being proportional to a block of size N extracted from the vector UY.

28. A radio communication receiver, comprising conversion means for producing successive vectors Y of L digital samples from a received radio signal, L being an integer greater than 1, means for measuring the response of at least one transmission channel, so as to determine, for each of said vectors Y, a matrix A of L rows and N columns such that the vector Y is of the form $Y = AD + Y_N$, where D is a vector of size N made up of discrete symbols of at least one signal transmitted and $Y_N$ represents a vector of L noise samples, N being an integer greater than 1, and equalisation means for estimating, on the basis of each vector Y, the discrete symbols of at least one transmitted signal forming part of the components of the corresponding vector D, wherein the equalisation means comprise:

means for determining an upper triangular matrix T of N rows and N columns and a vector Z of a size N such that two quadratic criteria $\|TX-Z\|^2$ and $\mu\|AX-Y\|^2$ are minimum for a same vector X of size N;

means for dividing the vector Z into J blocks $Z_i$ ($1 \leq i \leq J$) and the matrix T into $J(J+1)/2$ blocks $T_{i,j}$ ($1 \leq j \leq i \leq J$), J being an integer greater than 1, the block $Z_i$ being made up of $N_i$ components of the vector Z, the $N_i$'s being integers such that $$\sum_{i=1}^{J} N_i = N,$$

and the block $T_{i,j}$ being made up of $N_i$ rows and $N_j$ columns, in the form:

$$Z = \begin{pmatrix} Z_J \\ \vdots \\ Z_2 \\ Z_1 \end{pmatrix} \text{ and } T = \begin{pmatrix} T_{J,J} & \cdots & \cdots & T_{J,2} & T_{J,1} \\ 0 & \ddots & & \vdots & \vdots \\ \vdots & \ddots & \ddots & \vdots & \vdots \\ 0 & & \ddots & T_{2,2} & T_{2,1} \\ 0 & \cdots & \cdots & 0 & T_{1,1} \end{pmatrix};$$

means for estimating $N_1$ of the discrete symbols as being the components of a vector $\hat{D}_1$ equal to that of the vectors $X_1$ made up of $N_1$ components taking the different possible values of the discrete symbols, which minimises the quantity $\|T_{1,1} X_1 - Z_1\|^2$.

29. A radio communication receiver, comprising conversion means for producing successive vectors Y of L digital samples from a received radio signal, L being an integer greater than 1, means for measuring the response of at least one transmission channel, so as to determine, for each of said vectors Y, a matrix A of L rows and N columns such that the vector Y is of the form $Y = AD + Y_N$, where D is a vector of size N made up of discrete symbols of at least one signal transmitted and $Y_N$ represents a vector of L noise samples, N being an integer greater than 1, and equalisation means for estimating, on the basis of each vector Y, the discrete symbols of at least one transmitted signal forming part of the components of the corresponding vector D, wherein the equalisation means comprise:

means for determining an upper triangular matrix T of N rows and N columns and a vector Z of a size N such that two quadratic criteria $\|TX-Z\|^2$ and $\|AX-Y\|^2$ are minimum for a same vector X of size N;

means for dividing the vector Z into J blocks $Z_i$ ($1 \leq i \leq J$) and the matrix T into $J(J+1)/2$ blocks $T_{i,j}$ ($1 \leq j \leq i \leq J$), J being an integer greater than 1, the block $Z_i$ being made up of $N_i$ components of the vector Z, the $N_i$'s being integers such that $$\sum_{i=1}^{J} N_i = N,$$

and the block $T_{i,j}$ being made up of $N_i$ rows and $N_j$ columns, in the form:

$$Z = \begin{pmatrix} Z_J \\ \vdots \\ Z_2 \\ Z_1 \end{pmatrix} \text{ and } T = \begin{pmatrix} T_{J,J} & \cdots & \cdots & T_{J,2} & T_{J,1} \\ 0 & \ddots & & \vdots & \vdots \\ \vdots & \ddots & \ddots & \vdots & \vdots \\ 0 & & \ddots & T_{2,2} & T_{2,1} \\ 0 & \cdots & \cdots & 0 & T_{1,1} \end{pmatrix};$$

means for performing successively for each integer value of i from i=1 to i=imax, the integer imax being such that $2 \leq \text{imax} \leq J$, a step of determining a number $M_i \geq 1$ of estimation vectors $\hat{E}_i^{(m)}$ ($1 \leq m \leq M_i$), made up of $$P_i = \sum_{j=1}^{i} N_j$$

components whose values are among the different possible values of the discrete symbols, in the form $$\hat{E}_i^{(m)} = \begin{pmatrix} X_i^{(m)} \\ \hat{E}_{i-1}^{(m')} \end{pmatrix},$$

where $\hat{E}_{i-1}^{(m')}$ is an estimation vector of size $P_{i-1}$ determined at the preceding step if i>1 ($1 \leq m \leq M_{i-1}$) and $X_i^{(m)}$ is a vector of size $N_i$, whereby said $M_i$ estimation vectors $\hat{E}_i^{(m)}$ minimise the quantity $\delta_i^{(m)} = \delta_{i-1}^{(m')} + \|T_{i,i} X_i^{(m)} - \tilde{Z}_i^{(m')}\|^2$, where $\delta_0^{(m')} = 0$, $\tilde{Z}_1^{(m')} = Z_1$, and $\tilde{Z}_i^{(m')} Z_i - (T_{i,i-1} \cdots | T_{1,2} | T_{i,1}) \hat{E}_{i-1}^{(m')}$ for i>1, and wherein, the number $M_{imax}$ being equal to 1, $P_{imax}$ discrete symbols are estimated by the components of the estimation vector $\hat{E}_{imax}^{(1)}$.

* * * * *